United States Patent [19]

Niu et al.

[11] Patent Number: 5,019,341

[45] Date of Patent: May 28, 1991

[54] METHOD OF INHIBITING CORROSION OF METAL SURFACES IN CONTACT WITH A CORROSIVE HYDROCARBON CONTAINING MEDIUM

[75] Inventors: Joseph H. Y. Niu, Houston; James G. Edmondson, Conroe; Scott E. Lehrer, Houston, all of Tex.

[73] Assignee: Betz Laboratories, Inc., Trevose, Pa.

[21] Appl. No.: 895,542

[22] Filed: Aug. 11, 1986

[51] Int. Cl.$^5$ ............................................. C23F 11/14
[52] U.S. Cl. ........................................ 422/7; 252/390; 422/14; 422/16
[58] Field of Search ................. 422/7, 14, 16; 252/390

[56] References Cited

U.S. PATENT DOCUMENTS

| | | |
|---|---|---|
| 3,397,152 | 11/1969 | Brown et al. . |
| 3,404,165 | 2/1970 | Budde et al. . |
| 3,412,024 | 2/1970 | Stanford . |
| 3,445,441 | 3/1970 | Rushton . |
| 3,554,897 | 1/1971 | Stanley . |
| 3,705,109 | 12/1972 | Hausler ................................ 422/16 |
| 4,131,583 | 1/1979 | Boerwinkle et al. . |
| 4,240,804 | 12/1980 | Shields ................................ 44/71 |
| 4,315,087 | 2/1982 | Redmore ......................... 252/8.55 |
| 4,339,349 | 7/1982 | Martin et al. ......................... 422/12 |
| 4,344,861 | 8/1982 | Levy .................................... 422/16 |

FOREIGN PATENT DOCUMENTS

| | | |
|---|---|---|
| 0087277 | 8/1983 | European Pat. Off. . |
| 817262 | 7/1959 | United Kingdom . |
| 1109579 | 4/1968 | United Kingdom . |

OTHER PUBLICATIONS

Tomah Chemical Product Fact Sheet, TWY #810-28-0-1401 Sep. 15, 1982.

*Primary Examiner*—Robert J. Warden
*Assistant Examiner*—Timothy M. McMahon
*Attorney, Agent, or Firm*—Alexander D. Ricci; Steven D. Boyd

[57] ABSTRACT

Hydrocarbon soluble polyamidoamines prepared from tallowtriamine and/or tallowtetramine—(methyl)acrylate reactants are effective corrosion inhibitors for metal surfaces in contact with corrosive hydrocarbon mediums even under alkaline conditions.

11 Claims, No Drawings

METHOD OF INHIBITING CORROSION OF METAL SURFACES IN CONTACT WITH A CORROSIVE HYDROCARBON CONTAINING MEDIUM

FIELD OF THE INVENTION

The present invention is directed toward the use of certain hydrocarbon soluble polyamidoamine-type corrosion inhibitors in refinery and/or petrochemical process systems to inhibit corrosion of metal surfaces under alkaline conditions.

BACKGROUND OF THE INVENTION

Corrosion has always and is presently a significant problem in the refining and petrochemical industries by reason of equipment replacement costs and system downtime associated therewith.

For example, in refinely operation, the crude oil itself commonly contains corrosive impurities such as salts, sulfur compounds, naphthenic and other organic acids such as acetic and propionic, nitrogen compounds and inorganic acids such as hydrochloric acid. Corrosion by crude oil impurities is accelerated by the high temperatures (e.g., 100° F.-1000° F.) commonly encountered when oils or petrochemicals are processed. In many cases, crudes are processed at temperatures within the range of 600-1000° F.

Furthermore, upon heating or subjecting the crude oil to various catalytic processes, the impurities are converted more completely to volatile and water-soluble compounds. Examples of these are: HCl; CO; $CO_2$; formic, acetic and other volatile carboxylic acids; $H_2S$; $SO_2$; $SO_3$ and $NH_3$. Besides $NH_3$, other basic compounds, especially monoethanolamine, diethanolamine, etc. can be present because of the rerouting of various refinery "slop" streams for reprocessing. In catalytic units, more $NH_3$ and $H_2S$ are formed relative to the stronger inorganic and organic acids than in simple distillation equipment. Thus the composition and pH of the corrosive aqueous phase can vary substantially and be dependent upon crude oil contaminants and processing. Furthermore, the pH within a given system will change as water condensation proceeds due to the different distribution function of the volatile species among hydrocarbon, aqueous and vapor phases.

In FCC units and certain crude units, aqueous condensates can be alkaline in nature Data for many conventional corrosion inhibitors show that significantly high treatment levels are required for corrosion protection of ferrous and non-ferrous containers in high pH, sulfidic environments The use of such high treatment levels is economically unattractive.

This is especially true for admiralty brass and would be expected to be true for other copper alloys (e.g., cupronickels). This phenomenon is a result of the stability of copper/ammonia (or amine) complexes. At high pH (above 7.0), the amines convert from cationic to neutral forms with a corresponding increased propensity to complex copper ions in solution This accelerates corrosion by removal of the metal atoms and corrosion products The present invention has particular utility in overhead condensing systems of various refinery and petrochemical processing units. Usually the units themselves and their associated piping are of sufficient thickness to provide many years of service under general corrosive attack. In these units, however, tower trays and heat exchanger tubes are relatively thin due to weight constraints or to allow high rates of heat transfer. Thus, these components are subject to shorter service life, especially if localized corrosion, such as underdeposit corrosion, occurs. This is more likely to occur in alkaline systems where various ammonia or amine salts can form deposits leading to localized attack. The tubes are usually made of mild steel due to the low cost of this metal, but admiralty brass and cupronickel are frequently used. In extremely aggressive systems titanium heat exchanger bundles have been used.

Besides corrosion inhibition, another desirable property of any inhibitor is substantial solubility in the hydrocarbon fluids being treated. Lack of sufficient solubility can lead to deposition or plugging problems. The inhibitors are usually fed as concentrated solutions (percent levels) into a stream which is primarily vapor and of high temperature. The inhibitor must stay soluble under these conditions in order to contact and film the metal parts and to prevent agglomeration and deposition. This is particularly important in catalytic units which produce light hydrocarbon products. As discussed above, the formation of deposits on thin parts such as exchanger tubes can lead to frequent leaks and downtime due to underdeposit corrosion or physical blockage A further effect of such deposits is to impede heat transfer. Since most corrosion inhibitors contain amine functionality, they can be aggressive to copper alloys. Also, because these inhibitors partition to the oil phase in preference to water, they are returned to the tower via reflux streams. As the reflux vaporizes, insufficient solubility of the filmer will result in deposition on tower trays. Accumulation of such deposits will interfere with establishment of vapor-liquid equilibria within the tower and cause excessive pressure drops within the tower.

The present invention combines both excellent corrosion inhibition and increased hydrocarbon solubility properties.

SUMMARY OF THE INVENTION

We have found that certain hydrocarbon soluble polyamidoamines derived from tallowtriamine or tallowtetramine exhibit superior mild steel and admiralty brass corrosion inhibition under alkaline conditions even at surprisingly low concentrations. This is quite unexpected since other polyamidoamines derived from oleyldiamine or even tallowdiamine do not provide such protection at the low concentration levels tested. In fact, the tallowtriamine and tallowtetramine reaction products of the invention were compared with a commercially available complex polyamidoamine and with an alkyl imidazoline corrosion inhibitor and were found capable of providing superior protection at lower treatment dosages than those needed for commensurate protection by the aforementioned commercially available corrosion inhibitors.

PRIOR ART

Polyamidoamines are not new. A multiplicity of same are disclosed in U.S. Pat. No. 3,445,441 (Rushton) and are generically described therein as being formed via reaction of a polyamine and acrylate compounds such as methylacrylate compounds (e.g., methylacrylate and other lower alkyl esters of acrylic acid). However, the specific polyamidoamines of the present invention are not specifically mentioned.

The Rushton patent discloses a myriad of uses for the polyamidoamines. For instance, the patent states that they be used, inter alia, as emulsion breakers, corrosion inhibitors for metals, "most particularly iron, steel and ferrous alloys" (Col. 14, lines 16-17), water clarifiers, flocculants, etc. Rushton is silent with respect to use of the specific hydrocarbon soluble tallowtriamine/tallowtetramine based polyamidoamines herein disclosed and claimed to inhibit alkaline corrosion of mild steel and admiralty brass. Rushton tested his reaction products under acidic conditions where most known inhibitor compounds are effective. In contrast, in accordance with the present invention, effective corrosion inhibition is accomplished even under the highly alkaline conditions noted above.

Also of possible interest to the invention are: U.S. Pat. No. 4,131,583 (Boerwinkle, et al.) which discloses corrosion inhibiting compositions combining (1) a salt of carboxylic acid and organic amine and (2) water dispersible polymers; U.S. Pat. No. 3,397,152 (Brown, et al.) which discloses the use of aryl stearic amines as corrosion inhibitors., U.S. Pat. No. 3,412,024 (Stanford) disclosing alkyl benzene sulfonic acid salts of partial amides of organic polyamines and certain organic acids; and U.S. Pat. No. 3,404,165 (Budde, et al.).

DETAILED DISCLOSURE

The corrosion inhibitors of the invention are hydrocarbon soluble reaction products of (1) tallowtriamine or tallowtetramine and (2) an acrylic acid compound having the formula:

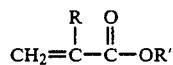

wherein R=H or $CH_3$ and R' is methyl, ethyl, propyl, isopropyl, butyl, amyl, or hexyl (i.e., branched or straight chain $C_1$ - $C_6$ alkyl). Based upon laboratory tests, the presently preferred reaction product is a polyamidoamine made with tallowtetramine or tallowtriamine and methylacrylate in a 1:1 molar ratio.

The reaction products may be formed via the preparatory route outlined at Column 3, lines 3-39, of the aforementioned Rushton patent; the entire disclosure of which is hereby incorporated by reference.

Accordingly, the polymerization reaction may be carried out at temperatures up to 200° C. and even higher. Generally, the reactants are first heated below 100° C., such as at 80-90° C., for a suitable period of time, such as a few hours. Since the tallowtriamines and tallowtetramine reactants are preferably to be reacted with methylacrylate, the progress of the reaction can be determined by the removal of $CH_3OH$ in forming the amide. During the early part of the reaction, alcohol may be quite readily removed from the reaction mixture at temperatures below 100° C. As the reaction slows, the temperature is raised to accelerate the polymerization to completion. The temperature may be raised to 150-200° C. toward the end of the reaction. Removal of the alcohol ($CH_3OH$ when methylacrylate is used) is a way of determining the progress and completion of the reaction.

Generally, the molar ratios of the (1) tallowtriamine and/or tallowtetramine reactant to the (2) acrylic acid type reactant may vary within a range of a (1):(2) of 1:2 to 2:1. The presently preferred tallowtriamine and/or tallowtetramine-methylacrylate reaction product is prepared by an equimolar concentration of the two reactants.

In addition to the above reactants, (3) alkylenepolyamines such as those having from about 3-10 amino groups and from about 2-6 carbon alkylene groups may be incorporated into the polymeric matrix via conventional techniques. When such alkylenepolyamine addition is desired, triethylenetetramine is presently preferred. When this third reactant (3) is employed, the molar ratios of components (1):(2):(3) may be within the range of 1:0.5-2.0:0.5-2.0.

The reaction product may be coated on the metal substrate for which protection is desired by pretreatment of the metal surface or by continuous addition to the corrosive fluids. Generally, the hydrocarbon soluble tallowtriamine/tallowtetramine reaction products may be admitted to the hydrocarbon medium in an amount of about 0.5-500 parts reaction product to one million parts hydrocarbon. From an economical point of view, it is desirable to add only about 0.5-50 parts of the corrosion inhibitor. This low addition range provides one of the distinct advantages of the invention in that superior metal corrosion inhibition is effected at low, economical feedrates even under alkaline conditions.

It should be understood herein that the term hydrocarbon is herein used in its broadest generic sense covering all petroleum rock oils, corrosive crudes, crudes in various stages of refining, and petrochemicals generally.

The following examples are presented for purposes of illustration only and are not to be construed as to limit the invention.

EXAMPLES

In order to ascertain the effectiveness of the hydrocarbon soluble methylacrylate-tallowtriamines and methylacrylate-tallowtetramines of the present invention in inhibiting corrosion of metals in alkaline environments, a series of polyamidoamines based on tallow di, tri, and tetramines were prepared as described earlier and were evaluated using the conditions outlined below.

TEST PROCEDURES

Two procedures were used to evaluate corrosion inhibitors under alkaline conditions. The conditions are similar to those encountered in an FCC unit condensation system. As discussed above, alkaline corrosion can also occur in crude oil distillation towers depending on crude oil source and operating conditions:

Metallic coupons are cleaned by conventional cleaning methods. After rinsing with distilled water and isopropanol, the coupons are dried and weighed. Corrosion tests are conducted with a 2:1 brine to hydrocarbon ratio at about 150° F. on a "corrosion wheel" for several hours. The brine consists of $NH_4Cl$ and $(NH_4)_2S$ in distilled water. For admiralty brass tests the brine pH is adjusted to 9.1 with addition of $NH_4OH$. The mild steel brine pH is adjusted to 7.7 with HCl. After the test exposure, coupons are cleaned by conventional methods. After rinsing as above, coupons are dried and weighed.

Evaluation of performance is by percent protection, defined as:

$$\% P = \frac{\text{(average blank weight loss)} - \text{(treated weight loss)}}{\text{average blank weight loss}} \times 100$$

For ease of comparison, examples of the present invention are numbered, whereas comparative examples have been assigned letter designations.

COMPARATIVE EXAMPLE A

The product of the reaction of an equimolar ratio of tallowdiamine and methylacrylate was found to have an average molecular weight of 970 g/mol and contained 6.9% nitrogen by weight. When tested as a corrosion inhibitor for admiralty brass using the conditions described above, an average protection of 15% was achieved when the inhibitor was added at a concentration of 5.0 ppm by volume.

COMPARATIVE EXAMPLE B 0.5 moles of tallowdiamine and 0.5 moles HPA-2* were reacted with 1 mole of methylacrylate. The resulting complex polyamidoamine product had an average molecular weight of 490 g/mol and a nitrogen content of 15.6%. When this synthesized corrosion inhibitor was tested at a concentration of 2.5 ppm under conditions described above for admiralty brass, an average protection level of 26% was achieved.

*HPA-2 complex mixture of ethyleneamines containing derivatives with six or more nitrogen atoms per molecule -- available Union Carbide Corporation.

COMPARATIVE EXAMPLE C 0.5 moles of oleyldiamine and 0.5 moles of HPA-2 were reacted with 1 mole of methylacrylate. The resulting product had an average molecular weight of 550 g/mol and had a nitrogen content of 15.6% by weight. This reaction product was tested as a corrosion inhibitor for admiralty brass under the conditions given above and an average protection of 7% was achieved when added at a concentration of 2.5 ppm by volume.

COMPARATIVE EXAMPLE D 1 mole of HPA and 1 mole of methylacrylate were reacted. The resulting product had an average molecular weight of 630 g/mol and contained 24.0% nitrogen by weight. When this synthesized corrosion inhibitor was tested at a concentration of 10 ppm under conditions described above for admiralty brass, an average protection of 43% was achieved.

COMPARATIVE EXAMPLE E

OFC-1180* was tested as a corrosion inhibitor under the conditions described above for admiralty brass. Average protection levels of 28% and 40% were determined when added at concentrations of 1.0 and 2.5 ppm, by volume, respectively.

*OFC-1180, available Chemlink Petroleum, Inc., polyimido amine estimated MW of 605 g/mol with a nitrogen content of approximately 6.9% by weight.

COMPARATIVE EXAMPLE F

When CI-11C, an imidazoline based corrosion inhibitor commercially available from Betz Process Chemicals, Inc., was used as a corrosion inhibitor of admiralty brass under the conditions described above, average protection levels of 12%, 38%, 52% and 80% were determined when added at concentrations of 1.0, 2.0, 4.0 and 10 ppm, respectively.

EXAMPLE 1

The product of the reaction of an equimolar ratio of tallowtriamine and acrylic acid was determined to have an average molecular weight of 520 g/mol and contained 9.0% nitrogen by weight. When the synthesized corrosion inhibitor was tested at concentrations of 1.0, 5.0 and 10 ppm, under conditions described above for admiralty brass, average protection levels of 27%, 59% and 66% were determined, respectively.

EXAMPLE 2

The product of the reaction of an equimolar ratio of tallowtriamine and methylacrylate was determined to have an average molecular weight of 920 g/mol and contained 8.9% nitrogen by weight. When the synthesized corrosion inhibitor was tested at concentrations of 1.0, 5.0 and 10 ppm under conditions described above for admiralty brass, average protection levels of 51%, 56% an 64% were determined, respectively.

EXAMPLE 3

The product of the reaction of an equimolar ratio of tallowtriamine and methylacrylate was determined to have an average molecular weight of 1160 g/mol and contained 8.9% nitrogen by weight. When the synthesized corrosion inhibitor was tested at concentrations of 1.0 and 2.5 ppm under conditions described above for admiralty brass, average protection levels of 36% and 49% were determined, respectively.

EXAMPLE 4

The product of the reaction of an equimolar ratio of tallowtriamine and methylacrylate was determined to have an average molecular weight of 1460 g/mol and contained 8.9% nitrogen by weight. When the synthesized corrosion inhibitor was tested at concentrations of 1.0 and 2.5 ppm under conditions described above for admiralty brass, average protection levels of 46% and 47% were determined, respectively.

EXAMPLE 5

The product of the reaction of an equimolar ratio of tallowtriamine and methylacrylate was determined to have an average molecular weight of 1640 g/mol and contained 8.9% nitrogen by weight. When the synthesized corrosion inhibitor was tested at concentrations of 1.0 and 2.5 ppm under conditions described above for admiralty brass, average protection levels of 35% and 43% were determined, respectively.

EXAMPLE 6

The product of the reaction of an equimolar ratio of tallowtetramine and methylacrylate was determined to have an average molecular weight of 730 g/mol and contained 11.3% nitrogen by weight. When the synthesized corrosion inhibitor was tested at concentrations of 1.0 and 2.5 ppm under conditions described above for admiralty brass, average protection levels of 41% and 70% were determined, respectively.

EXAMPLE 7

The product of the reaction of an equimolar ratio of tallowtetramine and methylacrylate was determined to have an average molecular weight of 900 g/mol and contained 11.3% nitrogen by weight. When the synthesized corrosion inhibitor was tested at concentrations of 1.0 and 2.5 ppm under conditions described above for admiralty brass, average protection levels of 40% and 51% were determined, respectively.

EXAMPLE 8

The product of the reaction of tallowtetramine and methylacrylate when added in a 1:1.5 ratio was determined to have an average molecular weight of 1490 g/mol and contained 10.7% nitrogen by weight. When the synthesized corrosion inhibitor was tested at concentrations of 1.0 and 2.5 ppm under conditions described above for admiralty brass, average protection levels of 41% and 65% were determined, respectively.

EXAMPLE 9

The product of the reaction of an equimolar ratio of tallowtetramine and methylacrylate was determined to have an average molecular weight of 1730 g/mol and contained 11.3% nitrogen by weight. When the synthesized corrosion inhibitor was tested at concentrations of 1.0 and 2.5 ppm under conditions described above for admiralty brass, average protection levels of 29% and 48% were determined, respectively.

EXAMPLE 10

The product of the reaction of tallowtetramine and methylacrylate when added in a 1:2 ratio was determined to have an average molecular weight of 2500 g/mol and contained 10.2% nitrogen by weight. When the synthesized corrosion inhibitor was tested at concentrations of 1.0 and 2.5 ppm under conditions described above for admiralty brass, average protection levels of 37% and 64% were determined, respectively.

EXAMPLE 11

The product of the reaction of tallowtetramine and methylacrylate when added in a 1:2 ratio was determined to have an average molecular weight of 3000 g/mol and contained 10.2% nitrogen by weight. When the synthesized corrosion inhibitor was tested at concentrations of 1.0 and 2.5 ppm under conditions described above for admiralty brass, average protection levels of 22% and 57% were determined, respectively.

EXAMPLE 12

Tallowtetramine (0.5 mol) and triethylenetetramine (0.5 mol) were reacted with 1.0 mole methylacrylate. The resulting polyamidoamine had an average molecular weight of 700 g/mol and a nitrogen content of 14.0% by weight. When this synthesized corrosion inhibitor was tested at concentrations of 1.0 and 2.5 ppm under conditions described above for admiralty brass, average protection levels of 48% and 62% were determined, respectively.

EXAMPLE 13

0.5 mole tallowtetramine and 0.5 mole triethylenetetramine were reacted with 1.0 mole methylacrylate. The resulting polyamidoamine, having an average molecular weight of 630 g/mol and 16.1% nitrogen, was obtained. When the synthesized corrosion inhibitor was tested under the admiralty brass conditions expressed above at a concentration of 2.5 ppm, an average protection level of 58% was determined.

EXAMPLE 14

0.5 mole tallowtetramine and 0.5 mole triethylenetetramine were reacted with 1 mole of methylacrylate. The resulting polyamidoamine had an average molecular weight of 960 g/mol and a nitrogen content of 16.1%. When the synthesized corrosion inhibitor was tested at a concentration of 2.5 ppm under the admiralty brass conditions above expressed, an average protection level of 30% was determined.

EXAMPLE 15

0.5 mole tallowtetramine and 0.5 mole triethylenetetramine were reacted with 1 mole of methylacrylate. The resulting polyamidoamine had an average molecular weight of 980 g/mol and a nitrogen content of 16.1%. When this synthesized corrosion inhibitor was tested at a concentration of 2.5, an average protection level of 19% for admiralty brass was determined.

EXAMPLE 16

1 mole of tallowtetramine was reacted with 1 mole of acrylic acid to yield a product containing 11.4% nitrogen by weight. When tested in accord with the admiralty brass inhibition procedures supra, an average of 31% protection was afforded when 2.5 ppm of the reaction product was used.

EXAMPLE 17

1 mole of tallowtetramine was reacted with 1 mole of acrylic acid to yield a product containing 11.4% nitrogen by weight. When tested in accord with the admiralty brass inhibition procedures supra, an average of 41% protection was afforded when 2.5 ppm of the reaction product was used.

A summary of the admiralty brass corrosion inhibition tests is given in Table I.

The following examples were undertaken to determine the efficacy of the present invention in inhibiting corrosion of mild steel under alkaline conditions. As per above, examples of the present invention are numbered, whereas comparative examples have been given letter designations.

TABLE I

| Example | Amine | Acrylate | Ratio | % N | Percent Protection 1.0 ppm | 2.5 ppm | 5.0 ppm | 10 ppm |
|---|---|---|---|---|---|---|---|---|
| A | Tallowdiamine | Methylacrylate | 1:1 | 6.9 | | | 15(2) | |
| B | Tallowdiamine and HPA-2 (1:1) | Methylacrylate | 1:1 | 15.6 | | 26(2) | | |
| C | Oleyldiamine and HPA-2 (1:1) | Methylacrylate | 1:1 | 15.6 | | 7(2) | | |
| D | HPA-2 | Methyacrylate | 1:1 | 24.0 | | | | 43(2) |
| E | OFC-1180 | | | 6.9 | 28(10) | 40(8) | | |
| F | CI-11C | | | | 12(2)* ** | 38(2) *** | 52(2) | 80(2) |
| 1 | Tallowtriamine | Acrylic Acid | 1:1 | 9.0 | 27(2) | | 59(2) | 66(2) |
| 2 | Tallowtriamine | Methylacrylate | 1:1 | 8.9 | 51(2) | | 56(2) | 64(2) |
| 3 | Tallowtriamine | Methylacrylate | 1:1 | 8.9 | 36(2) | 49(1) | | |

TABLE I-continued

| Example | Amine | Acrylate | Ratio | % N | Percent Protection 1.0 ppm | 2.5 ppm | 5.0 ppm | 10 ppm |
|---|---|---|---|---|---|---|---|---|
| 4 | Tallowtriamine | Methylacrylate | 1:1 | 8.9 | 46(2) | 47(2) | | |
| 5 | Tallowtriamine | Methylacrylate | 1:1 | 8.9 | 35(2) | 43(2) | | |
| 6 | Tallowtetramine | Methylacrylate | 1:1 | 11.3 | 41(7) | 70(4) | | |
| 7 | Tallowtetramine | Methylacrylate | 1:1 | 11.3 | 40(2) | 51(2) | | |
| 8 | Tallowtetramine | Methylacrylate | 1:1.5 | 10.7 | 41(7) | 65(4) | | |
| 9 | Tallowtetramine | Methylacrylate | 1:1 | 11.3 | 29(2) | 48(2) | | |
| 10 | Tallowtetramine | Methylacrylate | 1:2 | 10.2 | 37(6) | 67(4) | | |
| 11 | Tallowtetramine | Methylacrylate | 1:2 | 10.2 | 22(2) | 57(4) | | |
| 12 | Tallowtetramine and triethylenetetramine (1:1) | Methylacrylate | .5:.5:1 | 14.0 | 48(5) | 62(4) | | |
| 13 | Tallowtetramine and triethylenetetramine (1:1) | Methylacrylate | .5:.5:1 | 16.1 | | 58(3) | | |
| 14 | Tallowtetramine and triethylenetetramine | Methylacrylate | .5:.5:1 | 16.1 | | 30(3) | | |
| 15 | Tallowtetramine and triethylenetetramine | Methylacrylate | .5:.5:1 | 16.1 | | 19(3) | | |
| 16 | Tallowtetramine | Acrylic acid | 1:1 | 11.4 | | 31(2) | | |
| 17 | Tallowtetramine | Acrylic acid | 1:1 | 11.4 | | 41(2) | | |

\* = 1.5 ppm
\*\* = 2.0 ppm
\*\*\* = 4.0 ppm

COMPARATIVE EXAMPLE G

When OFC-1180 was tested as a corrosion inhibitor using the conditions described above for mild steel, average protection levels of 2% and 98% were determined when added at concentrations of 2.5 ppm and 5.0 ppm by volume, respectively.

COMPARATIVE EXAMPLE H

When CI-llC was used as a corrosion inhibitor for mild steel under the conditions described earlier, average protection levels of 17%, 93%, 96% and 96% were determined when added at concentrations of 10, 12.5, 15 and 20 ppm, respectively.

EXAMPLE 18

The product of the reaction of an equimolar ratio of tallowtriamine and methylacrylate was determined to have an average molecular weight of 1770 g/mol and contained 8.9% nitrogen by weight. When this synthesized corrosion inhibitor was tested at concentrations of 1.0, 2.5, 5.0 and 10 ppm under the conditions described above for mild steel, average protection levels of 12%, 56%, 95% and were determined, respectively.

EXAMPLE 19

The product of the reaction of an equimolar ratio of tallowtriamine and methylacrylate was determined to have an average molecular weight of 1710 g/mol and contained 8.9% nitrogen by weight. When the synthesized corrosion inhibitor was tested at concentrations of 1.0, 2.5, 5.0 and 10 ppm under the conditions described above for mild steel, average protection levels of 4%, 79%, 98% and 97% were determined, respectively.

EXAMPLE 20

The product of the reaction of an equimolar ratio of tallowtetramine and methylacrylate was determined to have an average molecular weight of 1970 g/mol and contained 11.3% nitrogen by weight. When this synthesized corrosion inhibitor was tested at concentrations of 1.0, 2.5, 5.0 and 10 ppm under the conditions described above for mild steel, average protection levels of 29%, 94%, 99% and 97% were determined, respectively.

EXAMPLE 21

The product of the reaction of an equimolar ratio of tallowtriamine and methylacrylate was determined to have an average molecular weight of 1460 g/mol and contained 8.9% nitrogen by weight. When the synthesized corrosion inhibitor was tested at concentrations of 2.5 and 5.0 ppm under the conditions described above for mild steel, average protection levels of 77% and 99% were determined, respectively.

The mild steel corrosion inhibition results are summarized in Table II.

TABLE II

| Example | Amine | Acrylate | Ratio | % N | Percent Protection 1.0 ppm | 2.5 ppm | 5.0 ppm | 10 ppm | 12.5 ppm | 15 ppm |
|---|---|---|---|---|---|---|---|---|---|---|
| | OFC-1180* | | | 6.9 | | 2(2) | 98(2) | | | |
| | CI-11C** | | | | | | | 17(2) | 93(2) | 96(2) |
| | Tallowtriamine | Methyacrylate | 1:1 | 8.9 | 12(2) | 56(2) | 95(2) | 97(2) | | |
| | Tallowtriamine | Methyacrylate | 1:1 | 8.9 | 4(2) | 79(2) | 98(2) | 97(2) | | |
| | Tallowtetramine | Methyacrylate | 1:1 | 11.3 | 29(2) | 94(2) | 99(2) | 97(2) | | |
| | Tallowtetramine | Methyacrylate | 1:1 | 11.3 | 44(2) | 95(2) | 98(2) | | | |
| | Tallowtetramine | Methyacrylate | 1:1 | 11.3 | 33(2) | 79(2) | 97(2) | | | |
| | Tallowtriamine | Methyacrylate | 1:1 | 8.9 | | 77(2) | 99(2) | | | |

*A mixture of polyamidoamines commercially available from Chemlink, Inc.
**A commercially available imidazoline based corrosion inhibitor from Betz Process Chemicals, Inc.

SOLUBILITY STUDIES

In order to access the solubility of the tallowtriamine/tetramine reaction products of the present invention, solubility studies in heptane and pentane solutions were undertaken. Results appear in Table III.

TABLE III

| | Solubility in Heptane or Pentane When Added at Concentration of 5,000 ppm | |
|---|---|---|
| Inhibitor | Heptane Solubility | Pentane Solubility |
| Tallowtetramine -methylacrylate 1:1 molar ratio 11.3% N | Material is soluble, no cloudiness or precipitate | Material is soluble, no cloudiness or precipitate |
| CI-11C | Material is soluble, no cloudiness or precipitate | Material is soluble, no cloudiness or precipitate |
| OFC-1180 | Material not soluble, heptane solution cloudy, tacky inhibitor deposit on bottom and sides of containers | Material not soluble, pentane solution cloudy, tacky inhibitor deposit on bottom and sides of containers |
| Tallowtetramine | Material is not soluble but precipitate is not tacky and disperses upon agitation | Material is not soluble but precipitate is not tacky and disperses upon agitation |

The solubility tests are significant as they demonstrate that the tallowtetramine/methylacrylate reaction product exhibits superior hydrocarbon solubility in comparison with the OFC-1180 product. Accordingly, use of the specific tallowtetramine/tallowtriamine based polyamidoamines of the present invention will be less likely to cause deposition, fouling and plugging than the 1180 material in hydrocarbon mediums. Since the tallowtetramine/methylacrylate polyamidoamine of Table III is totally soluble in both pentane and heptane at a concentration of 5,000 ppm, the present invention provides significant improvement over many conventional inhibitors which are efficient for alkaline sour corrosion. Although the imidazoline, CI1IC, has appreciable pentane and heptane solubility, it is a very inefficient alkaline sour corrosion inhibitor.

While the invention has been described hereinabove with respect to specific embodiments of same, such are not intended to limit the scope of the invention. The invention is intended to cover any equivalents, modifications, etc., and is intended to be limited solely by the scope of the appended claims.

We claim:

1. A method of inhibiting corrosion of metal surfaces in contact with a corrosive hydrocarbon-containing medium comprising contacting said metal surfaces with a hydrocarbon soluble polymerization reaction product of a) a component consisting essentially of tallowtriamine or tallowtetramine or mixtures thereof and b) an acrylic acid type compound having the structure,

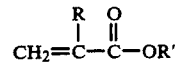

wherein R is hydrogen or methyl, and R' is methyl, ethyl, propyl, isopropyl, butyl, amyl, or hexyl.

2. A method as recited in claim 1 wherein said reaction product is added to said medium in an amount of from about 0.5–500 parts, based upon one million parts of hydrocarbon.

3. A method as recited in claim 2 wherein said reaction product is added to said medium in an amount of from about 0.5–50 parts per million parts of hydrocarbon.

4. A method as recited in claim 1 wherein said polymerization reaction product is also formed from an additional component (c), wherein (c) is a member selected from the group consisting of alkylene polyamines having from about 3 to about 10 amino groups and from about 2–6 carbon alkylene groups.

5. A method as recited in claim 4 wherein said component (c) comprises triethylenetetramine.

6. A method as recited in claim 1 wherein (b) comprises methylacrylate.

7. A method as recited in claim 1 wherein the molar ratio of a:b is from about 1-2:2-1.

8. A method as recited in claim 1 wherein said corrosive hydrocarbon containing medium is heated to temperatures of between about 100° F.–1000° F.

9. A method as recited in claim 1 wherein said corrosive hydrocarbon containing medium is heated to temperatures between about 600° F.–1000° F.

10. A method as recited in claim 1 wherein said metal surfaces comprise mild steel.

11. A method as recited in claim 1 wherein said metal surfaces comprise admiralty brass.

* * * * *